United States Patent [19]

Silverthorn et al.

[11] Patent Number: 4,629,062
[45] Date of Patent: Dec. 16, 1986

[54] BELT TRAINER APPARATUS FOR A CONVEYOR

[75] Inventors: Charles R. Silverthorn, Eureka; Marcus N. Allhands, Gridley, both of Ill.

[73] Assignee: A. D. Smith Harvestore Products, Inc., Arlington Heights, Ill.

[21] Appl. No.: 527,295

[22] Filed: Aug. 29, 1983

[51] Int. Cl.[4] ............................................. B65G 23/44
[52] U.S. Cl. ..................................... 198/813; 198/840
[58] Field of Search .................. 198/840, 813, 497, 806, 198/807, 808; 474/119, 122, 133, 151

[56] References Cited

U.S. PATENT DOCUMENTS

| | | | |
|---|---|---|---|
| 608,486 | 8/1898 | Sletto | 474/133 |
| 1,596,954 | 8/1926 | Tuttle | |
| 2,678,568 | 5/1954 | Orr | 74/241 |
| 2,821,291 | 1/1958 | Schott | 198/202 |
| 2,907,450 | 10/1959 | Reid | 198/813 |
| 2,909,272 | 10/1959 | Kerecman et al. | 198/497 |
| 3,029,655 | 4/1962 | Morrow | 198/840 |
| 3,303,924 | 2/1967 | Hartzell, Jr. | 198/808 |
| 3,715,027 | 2/1973 | Fujimoto | 198/806 |
| 3,837,291 | 9/1974 | Umlor | 105/163 |
| 4,140,216 | 2/1979 | Conrad | 198/840 |
| 4,141,245 | 2/1979 | Brandstetter | 73/144 |

FOREIGN PATENT DOCUMENTS

| | | | |
|---|---|---|---|
| 45540 | 2/1982 | European Pat. Off. | 198/808 |
| 1332235 | 10/1973 | United Kingdom | 198/840 |

Primary Examiner—Joseph E. Valenza
Assistant Examiner—Kyle E. Shane
Attorney, Agent, or Firm—Andrus, Sceales, Starke & Sawall

[57] ABSTRACT

A belt training device for a conveyor. The conveyor includes an endless belt which is mounted for travel on a drive roll and an idler roll and a trainer wheel is mounted on a pivotable bracket beneath the return run of the belt and adjacent the drive roll. The wheel is pivoted upwardly into engagement with the lower surface of the return run adjacent the side edge of the belt, toward which the belt would normally drift on reverse travel of the belt.

10 Claims, 3 Drawing Figures

BELT TRAINER APPARATUS FOR A CONVEYOR

BACKGROUND OF THE INVENTION

In a conventional endless belt conveyor, such as used for conveying feed, forage, or other bulk materials, the conveyor belt is mounted for endless travel around a idler roll and a drive roll. During operation of the belt, there may be a tendency for the belt to drift or ride off to one side. This misalignment of the belt can cause the side edge of the belt to ride against the conveyor frame, causing wear and abrasion to both the side edge of the belt and the frame, as well as possibly tearing the belt splice. Because of this, endless belt conveyors generally include a mechanism for maintaining proper alignment of the conveyor belt. The most common manner of maintaining proper alignment of the belt is to adjust or cant one of the supporting rolls, and by adjustment of the cant on a trial and error basis, while the belt is running, proper alignment can be obtained.

Occasionally, conveyors are requied to operate in both a forward and reverse direction and it has been found that while the belt may be properly aligned when running in a forward direction, reverse travel will cause serious misalignment, with the result that the alignment must be readjusted for reverse travel. Realignment is a time consuming operation, particularly when the belt is operated in the reverse direction only for short intervals of time.

The U.S. Pat. No. 2,821,291 to Schott recognizes the belt alignment problem associated with reversible conveyors. In this patent, a belt training mechanism is employed which includes a pair of rollers that are mounted on a pivotable bracket. The side edges of the belt ride against the rollers and the thrust of the side of the belt acting through the rollers acts to skew a roller operating in contact with the lower surface of the return run of the belt to maintain alignment of the belt. When the belt in the aforementioned patent is reversed in its direction of travel, the training mechanism must be manually adjusted for the reverse travel. Thus, the device in the patent does not automatically provide alignment when operating in both the forward and reverse directions.

SUMMARY OF THE INVENTION

The invention is directed to an improved belt training device that automatically acts to maintain proper alignment of the belt in either a forward or reverse direction without the need for any manual adjustment. In accordance with the invention, a trainer wheel is mounted on a bracket that is pivoted to the frame of the conveyor and the wheel is located beneath the return run of the belt adjacent the drive pulley. The wheel is pivoted upwardly into engagement with the lower surface of the return run adjacent the side edge of the belt, toward which the belt would normally drift on reverse travel of the belt, and increases the tension on that side edge of the belt. This results in the belt tending to move to the opposite side edge and compensates for the normal drifting of the belt that occurs during reverse movement of the conveyor to thereby maintain the belt in a neutral aligned condition. On re-establishment of forward travel, proper alignment of the belt will be maintained without further adjustment.

A second idler wheel can be positioned between the trainer wheel and the drive roll and is adapted to ride against the upper surface of the return run of the belt and urge the belt downwardly against the trainer wheel.

In operation, the endless belt is intially aligned when traveling in the forward direction in a conventional manner, as by adjusting the cant on one or both of the rolls. The direction of belt travel is then reversed, and without the trainer device in use, the belt will tend to drift to one side or the other. The trainer wheel is then mounted on the frame of the conveyor adjacent the side edge toward which the belt tends to drift and the wheel is pivoted upwardly into engagement with the lower run of the belt, thereby applying additional tension to the side edge of the belt and causing the belt to drift in the opposite direction to maintain a neutral, properly aligned condition for the belt. When the direction of travel of the belt is returned to a forward condition, alignment of the belt will be maintained without further adjustment of the trainer wheel.

The trainer device is of simple and inexpensive construction and can readily be attached to the frame of the conveyor.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTATED EMBODIMENT

Figure 1:
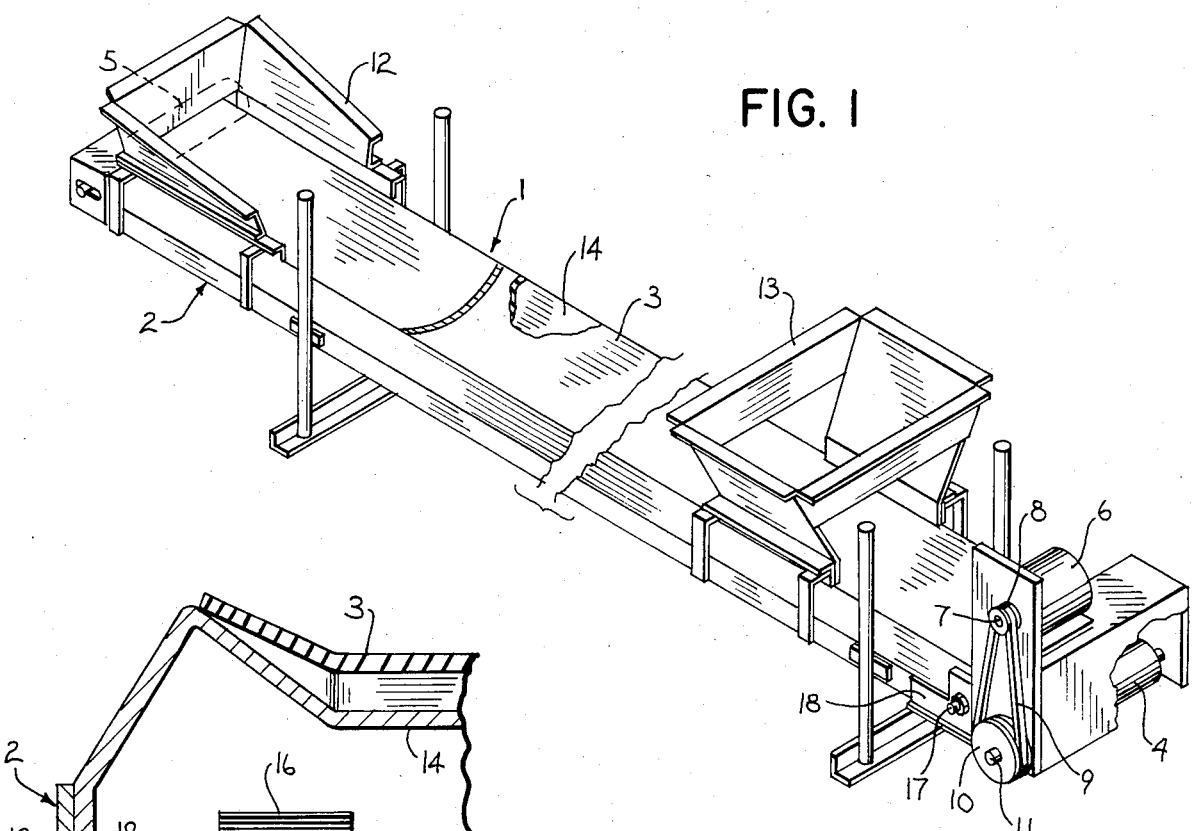
FIG. 1 is a perspective view of a conveyor incorporating the trainer device of the invention.

FIG. 1 illustrates a typical endless belt conveyor 1 which can be used to convey bulk material, such as feed, forage or other materials. Conveyor 1 includes a frame or supporting structure 2 and an endless belt 3 is mounted for travel about a drive roll 4 and an idler roll 5 in an upper conveying run and a lower return run.

Figure 2:
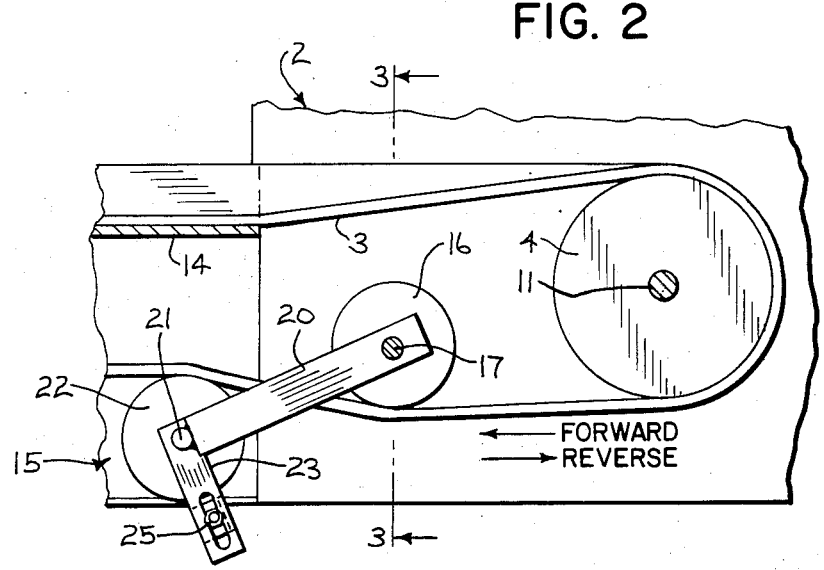
FIG. 2 is a fragmentary vertical section showing the drive roll and the belt trainer device.

To drive the drive roll 4, a motor 6 is mounted on frame 2 and the drive shaft 7 of motor 6 carries a pulley 8 which is connected by belt 9 to a pulley 10 mounted on shaft 11 of drive roll 4. With this drive connection, operation of the motor will move the belt in an endless path. Motor 6 is a reversible type so that the belt can travel in both forward and reverse directions, as indicated in FIG. 2.

Figure 3:
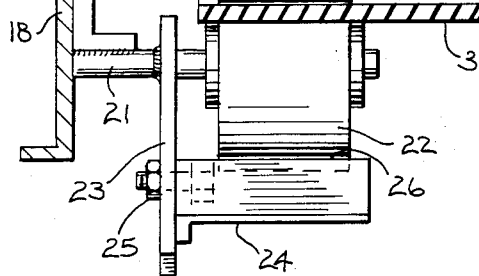
FIG. 3 is a section taken along line 3—3 of FIG. 2.

The material to be conveyed can be fed to one end of the belt by an end hopper 12. Alternately, a central hopper 13, which is located intermediate the drive roll and idler roll, can be employed to feed material to the conveyor belt. As best illustrated in FIG. 3, the belt is supported in the conveying run by a generally trough-shaped supporting surface 14, so that the belt, being flexible, will conform to the generally U-shaped configuration of the trough in the conveying run and will flatten out as it approaches the rolls 4 and 5.

In accordance with the invention, a belt trainer device 15 is employed to maintain proper alignment of the belt in both a forward and reverse direction. The trainer device 15 includes a freely rotatable idler wheel 16 which is mounted for rotation on bolt 17, which extends through the side wall 18 of frame 2. Lock nuts 19 are threaded on the end of bolt 17 and are located on either side of side wall 18.

Pivotally mounted on bolt 17 is a generally L-shaped mounting bracket 20, and a shaft 21 is welded or otherwise secured to the lower end of bracket 20. A trainer wheel 22, similar in construction to wheel 16 is rotatably supported on the end of shaft 21. As illustrated in FIGS. 2 and 3, the trainer wheel 22 is located adjacent the side edge of belt 3 and is engaged with the lower surface of the lower run of the belt. As shown in FIG. 2, the upper extremity of trainer wheel 22 is at a level slightly above the lower extremity of drive roll 4, so that the belt when travelling in the forward direction will move at a slightly inclined angle when travelling from the drive roll to the trainer wheel. This configuration provides increased tension for the side edge of the belt, tending to move the belt toward the opposite side edge to compensate for the normal drift of the belt which would be in a direction toward the trainer wheel.

The idler wheel 16 is located between the drive roll 4 and trainer wheel 22 and aids in urging the return run of the belt downwardly against the trainer wheel.

When conveying a material like forage, the forage adhering to the lower run of the belt 3 may tend to gather on the trailer wheel 22 and therefore a scraping mechanism is employed to scrape any forage or foreign material from the trainer wheel. In this regard, a scraper mounting arm 23 is welded or otherwise secured to shaft 21 and one end of an L-shaped scraper blade 24 is adjustlby mounted on arm 23 by a bolt 25. As shown in FIG. 3, the edge 26 of blade 24 is located in close proximity to trainer wheel 22 and will act to scrape any forage or other material from the wheel.

In operation, the belt is initally operated in a forward direction and is properly aligned in a conventional manner as by adjusting the cant of one of the rolls 4 or 5. With the belt properaly aligned, the direction of travel is reversed, which would normally cause the belt to drift toward one side edge or the other. The trainer device 15 is then attached to frame 2 along the side edge toward which the belt is tending to drift on reverse travel and arm 20 is pivoted around pivot axis 17 to bring trainer wheel 22 into engagement with the lower surface of the lower run of belt 3. Engagement of trainer wheel 22 with belt 3 applies increased tension to that side edge of the belt, causing the belt to drift in the opposite direction, opposite to the normal drift of the belt on reverse travel. The vertical height of the trainer wheel 22 is adjusted through pivotal action of arm 20 to obtain a substantially neutral condition in which the drift of the belt caused by the trainer wheel 22 compensates for the opposite normal drift caused by reverse travel, with the result that the belt will travel in a neutral, properly aligned condition.

When forward travel of the belt is reestablished, the belt will maintain proper alignment and no further adjustment is required. This result is unexpected in that one would normally expect the belt, if properly aligned in the reverse running direction, to be misaligned and require readjustment when operated again in the forward direction.

Thus, the trainer device of the invention will automatically maintain proper alignment of the belt in both a forward and reverse direction without the need of any manual adjustment when changing from forward to reverse movement.

Various modes of carrying out the invention are contemplated as being within the scope of the following claims particulary pointing out and distinctly claiming the subject matter which is regarded as the invention.

I claim:

1. A conveyor, comprising a frame, an endless conveyor belt, a pair of rolls mounted on the frame to support the belt in endless travel in an upper conveying run and a lower return run, one of said rolls being a drive roll and the other of said rolls being an idler roll, reversible drive means operably connected to the drive roll for moving the belt in a forward and reverse direction, primary belt trainer means for aligning the belt in a forward direction of travel, reversal of the direction of travel of said drive means causing said belt to drift laterally in a direction toward a side edge of the belt, secondary belt trainer means separate from said primary belt trainer means and including a belt trainer member disposed in engagement with only one side edge of the lower surface of the return run of the belt, the opposite side edge of said return run being free of contact with said secondary belt trainer means, and adjustable means operably connected to said belt trainer member for varying the vertical position of said member and said one side edge relative to said frame to thereby vary the tension on said one side edge of the belt, adjustment of the vertical position of said member compensating for the normal lateral drift of said belt on reverse operation of said belt to achieve a substantially aligned condition for the belt, the construction being such that return of travel of the belt to a forward direction maintains said alignment of the belt without further adjustment.

2. The conveyor claim 1, wherein the upper extremity of said member is at a level above the lower extremity of said drive roll, said return run extending at an upwardly inclined angle when passing from said drive roll to said member.

3. The conveyor of claim 1, and including a second member disposed between the drive roll and said belt trainer member and engaged with the upper surface of the return run of said belt.

4. The conveyor of claim 3, wherein the lower extremity of said second member is at a level below the upper extremity of said belt trainer member whereby said belt travels in an undulating path as it moved over said first and second members.

5. The conveyor of claim 1, and including a bracket, said trainer member being mounted for rotation on said bracket, and means for mounting the bracket for pivotal movement on said frame in a vertical plane.

6. A method of aligning an endless belt of a reversible conveyor in both forward and reverse directions of travel, comprising the steps of engaging an endless belt with a drive roll to drive the belt in a forward direction in an endless path comprising an upper conveying run and a lower return run, training the belt by a primary trainer means so that said belt runs in proper alignment in said forward direction, reversing the direction of travel of the belt so that the belt operates in a reverse direction and tends to drift toward one side edge of the belt as it travels in said reverse direction, engaging a belt trainer member separate from said primary trainer means with the lower surface of said return run adjacent said one side edge while maintaining the opposite side edge of the belt free of contact with any belt trainer member, and adjusting the vertical position of said belt trainer member to adjust the vertical position of said one side edge to cause the belt to drift toward the opposite side edge and compensate for the normal drift toward said one side edge so that said belt assumes a neutral properly aligned position when traveling in the reverse direction.

7. The method of claim 6, and including the step of thereafter driving the belt in a forward direction so that alignment of the belt is maintained without further adjustment of said belt trainer member.

8. The method of claim 7, and including the step of mounting said belt trainer member for rotation about an axis transverse to the direction of travel of said belt.

9. The method of claim 8, and including the step of adjusting the vertical position of said belt trainer member so that the upper extremity of said belt trainer member is at a level above the lower extremity of said drive roll.

10. The method of claim 8, and including the step of engaging an idler wheel with the upper surface of the return run of said belt at a location between said belt trainer member and said drive roll.

* * * * *